No. 853,632. PATENTED MAY 14, 1907.
T. W. GREEN.
PACKING FOR ROTARY BLOWER SHAFTS.
APPLICATION FILED MAR. 1, 1907.

WITNESSES:

INVENTOR
Thomas W. Green
BY
ATTORNEY.

UNITED STATES PATENT OFFICE.

THOMAS W. GREEN, OF PHILADELPHIA, PENNSYLVANIA, ASSIGNOR TO WILBRAHAM-GREEN BLOWER COMPANY, OF PHILADELPHIA, PENNSYLVANIA, A CORPORATION OF PENNSYLVANIA.

PACKING FOR ROTARY BLOWER-SHAFTS.

No. 853,632.      Specification of Letters Patent.      Patented May 14, 1907.

Application filed March 1, 1907. Serial No. 360,035.

*To all whom it may concern:*

Be it known that I, THOMAS W. GREEN, a citizen of the United States, residing in Philadelphia, in the county of Philadelphia and State of Pennsylvania, have invented certain new and useful Improvements in Packing for Rotary Blower-Shafts, of which the following is a specification.

My invention relates to the packing for shafts of rotary blowers that are used for pumping air, gas and similar fluids and the object of my improvement is to prevent any leakage around the shafts and to so adjust the packing that it may, if necessary, be renewed without stopping or interfering with the operation of the blower.

Figure 1:
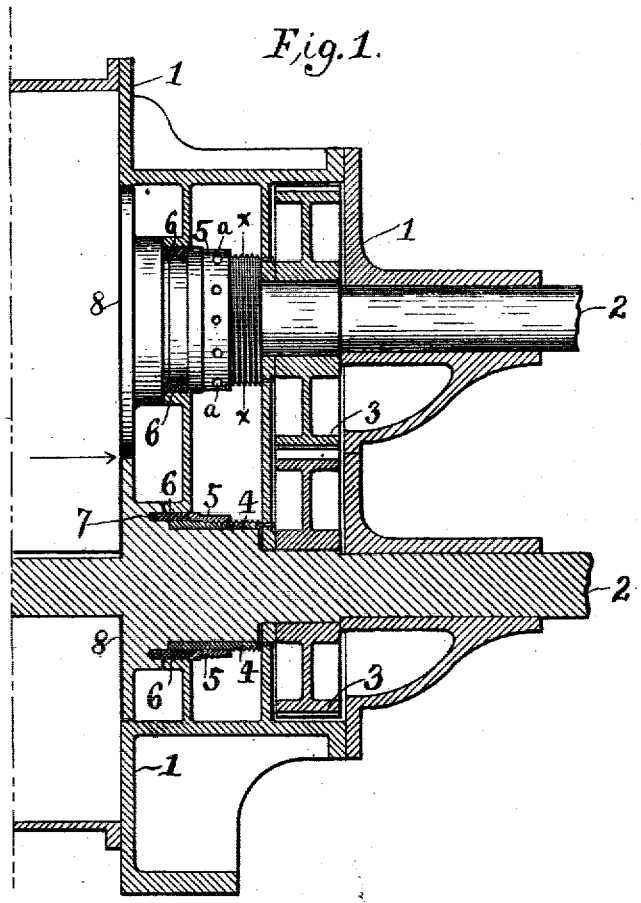
Figure 2:
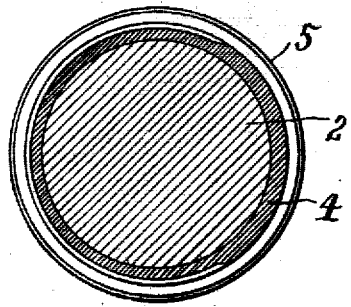

In the accompanying drawing, Figure 1, shows a horizontal sectional view through the end of a rotary blower having my improvement thereon. Fig. 2, is a section on line X—X of Fig. 1.

The numeral 1, represents the end casing of the blower in which the impeller shafts are journaled. 2, 2, the impeller shafts.

3, 3, are the gear wheels conveying the power from one impeller to the other.

4, 4, are collars surrounding the shafts 2, 2. These collars are secured in a stationary position and have their forward ends finished smoothly, the rear portion being screw threaded on the outside to fit an internally screw threaded gland or nut 5.

*a, a,* are small openings or holes in the gland 5, into which a spanner can be fitted when it is necessary to tighten or release the said gland.

6, 6, are rings of packing material surrounding the shafts and fitting into the channels or grooves 7, formed around the shafts and extending some distance into the part forming the head of the impeller.

8, 8, are the circular heads of the impellers. These heads fit into the end of the outside casing of the blower and are made to conform to the pitch line of the gear wheels 3, 3, consequently, they just touch each other. Around the circumference of these circular heads the leakage occurs when there is the slightest back pressure developed on the inside of the blower.

To fit the packing around the shaft, the screw threaded gland 5, is turned backward on the collar 4, thus leaving the inner and smoothly finished end of said collar exposed, the packing is then fitted around this smooth end of the collar and the gland 5, screwed up tightly, thus forcing the packing into the groove 7, in the position shown in the drawing and at the same time holding it stationary against rotation between said collar 4 and the adjacent portion of the casing, and preventing any leakage around the shafts.

The part of the end frame of the blower directly over the gland 5, is left open or provided with a movable cover, so that the packing may be renewed or adjusted whenever it is necessary to do so.

Having thus described my invention what I claim as new is:

1. In a pump or blower, a rotary shaft having in the part inside of the journal a circular groove or channel adapted to receive a packing material, a stationary collar fitting around said shaft and having its outer end externally screw threaded and an internally screw threaded gland fitting around said collar and adapted to force the packing material in the circular groove and tightly between the end of said collar and the adjacent portion of the casing, whereby the packing will be held in a stationary position and the leakage from the pump or blower prevented, substantially as shown.

2. In a rotary blower, the combination of the shaft 2 having the annular packing groove 7, the externally screw threaded stationary collar 4, fitting around the said shaft and the internally screw threaded gland 5, fitting over said collar and the packing 6, fitting around the forward end of the collar 4, and into the annular groove 7, and held stationary between said collar and the adjacent portion of the casing, substantially as shown and for the purpose described.

3. In a rotary pump or blower, the combination with a rotary shaft having in the part to the inner side of the journal a circular groove, of an externally screw-threaded stationary collar on said shaft, a packing material carried by said collar and projecting into said groove, and held against rotation by said collar and the adjacent portion of the casing, and an internally screw-threaded gland on said collar, adapted to force said packing tightly into said groove and between the end of said collar and the adjacent portion of the casing, whereby leakage from the pump or blower will be prevented.

In testimony whereof I affix my signature in presence of two witnesses.

THOMAS W. GREEN.

Witnesses:
    SADIE I. HARPER,
    THOS. D. MOWLDS.